United States Patent
Oh

(10) Patent No.: US 11,178,619 B1
(45) Date of Patent: Nov. 16, 2021

(54) ANTENNA UPLINK POWER CONTROL TO AVOID PERFORMANCE DEGRADATION

(71) Applicant: GM GLOBAL TECHNOLOGY OPERATIONS LLC, Detroit, MI (US)

(72) Inventor: Jang Hwan Oh, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/070,383

(22) Filed: Oct. 14, 2020

(51) Int. Cl.
*H04W 52/14* (2009.01)
*H04W 4/40* (2018.01)

(52) U.S. Cl.
CPC ........... *H04W 52/146* (2013.01); *H04W 4/40* (2018.02)

(58) Field of Classification Search
CPC . H04B 7/0691; H01Q 1/3216; H04W 52/146; H04W 4/40
USPC .................. 455/569.2, 569.1, 66.1, 522, 69
See application file for complete search history.

(56) References Cited

U.S. PATENT DOCUMENTS

| | | | |
|---|---|---|---|
| 2009/0140887 A1* | 6/2009 | Breed | G01S 17/86 340/990 |
| 2013/0027221 A1* | 1/2013 | Johnson | G08G 1/087 340/902 |
| 2016/0284213 A1* | 9/2016 | Cao | G01S 7/415 |

\* cited by examiner

*Primary Examiner* — John J Lee
(74) *Attorney, Agent, or Firm* — Lorenz & Kopf LLP

(57) ABSTRACT

In an exemplary embodiment, a vehicle includes antennas in proximity to one another; amplifiers; a computer memory; and a computer processor. The amplifiers are coupled to or part of the antennas. The computer memory stores a predetermined cases map that lists, for each of a plurality of combinations of frequencies for antennas, the predetermined cases map specifying, for each combination of frequencies, an amount of uplink RF power reduction required to reduce the degradation below a predetermined threshold. The computer processor is configured to retrieve, from the computer memory, the predetermined cases map; determine a current frequency combination for a current plurality of frequencies of the antennas of the vehicle; and provide instructions to one or more of the amplifiers to adjust a maximum RF power of one or more of the antennas, to thereby reduce receiver performance degradation between the antennas.

20 Claims, 3 Drawing Sheets

ANTENNA UPLINK POWER CONTROL TO AVOID PERFORMANCE DEGRADATION

INTRODUCTION

The technical field generally relates to the field of vehicles and, more specifically, to antenna transceiver systems for vehicles.

Many vehicles today include multiple antennas (e.g., cellular antennas). In various vehicles, each antenna can transmit uplink signals at the same time. However, in certain situations, this can result in intermodulation of signals (e.g., interference and/or other degradation of signals), which for example can impact downlink and uplink throughput.

Accordingly, it is desirable to provide systems and methods for controlling antenna transceiver systems for vehicles, for example for reducing intermodulation of signals from multiple antennas. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided that includes: determining, via a processor, a current frequency combination for a plurality of frequencies of respective antennas of a vehicle; retrieving, from a computer memory, a predetermined cases map that that specifies, for a plurality of antenna frequency combinations, an amount of uplink RF power reduction required to reduce the degradation below a predetermined threshold; and adjusting, via instructions provided by the processor to one or more amplifiers of the antennas, a maximum RF power of one or more of the antennas, based on the current frequency combination and the predetermined cases map, to thereby reduce receiver performance degradation between the antennas.

Also in an exemplary embodiment, the predetermined cases map is generated during a development stage in which the amount of uplink RF power reduction required to reduce the degradation is examined for a number of different frequency combinations.

Also in an exemplary embodiment, the amount of uplink RF power reduction required to reduce the degradation is determined via analysis, using a scientific model, for each of the different frequency combinations.

Also in an exemplary embodiment, the amount of uplink RF power reduction required to reduce the degradation is determined via physical testing for each of the different frequency combinations.

Also in an exemplary embodiment, the adjustment of the maximum uplink RF power of the one or more antennas includes a reduction of less than fifty percent of a total uplink RF power for the one or more antennas.

Also in an exemplary embodiment, the adjustment of the maximum uplink RF power of the one or more antennas includes a reduction of less than twenty five percent of a total uplink RF power for the one or more antennas.

Also in an exemplary embodiment, the adjustment of the maximum uplink RF power of the one or more antennas includes a reduction of less than five percent of a total uplink RF power for the one or more antennas.

In another exemplary embodiment, a system is provided that includes a non-transitory computer readable storage medium and a computer processor. The non-transitory computer readable storage medium stores a predetermined cases map that lists, for each of a plurality of combinations of frequencies for a plurality of antennas of a vehicle, the predetermined cases map specifying, for each combination of frequencies, an amount of uplink RF power reduction required to reduce the degradation below a predetermined threshold. The computer processor is coupled to the non-transitory computer readable storage medium configured to: retrieve, from the non-transitory computer readable storage medium, the predetermined cases map; determine a current frequency combination for a current plurality of frequencies of the plurality of antennas of the vehicle; and provide instructions to one or more amplifiers of the antennas to adjust a maximum RF power of one or more of the antennas, to thereby reduce receiver performance degradation between the antennas.

Also in an exemplary embodiment, the predetermined cases map is generated during a development stage in which the amount of uplink RF power reduction required to reduce the degradation is examined for a number of different frequency combinations, and wherein the amount of uplink RF power reduction required to reduce the degradation is determined via analysis, using a scientific model, for each of the different frequency combinations.

Also in an exemplary embodiment, the predetermined cases map is generated during a development stage in which the amount of uplink RF power reduction required to reduce the degradation is examined for a number of different frequency combinations, and wherein the amount of uplink RF power reduction required to reduce the degradation is determined via physical testing for each of the different frequency combinations.

Also in an exemplary embodiment, the adjustment of the maximum uplink RF power of the one or more antennas includes a reduction of less than fifty percent of a total uplink RF power for the one or more antennas.

Also in an exemplary embodiment, the adjustment of the maximum uplink RF power of the one or more antennas includes a reduction of less than twenty five percent of a total uplink RF power for the one or more antennas.

Also in an exemplary embodiment, the adjustment of the maximum uplink RF power of the one or more antennas includes a reduction of less than five percent of a total uplink RF power for the one or more antennas.

In another exemplary embodiment, a vehicle is provided that includes: a body; a plurality of antennas; a plurality of amplifiers; a computer memory; and a computer processor. The plurality of antennas are stored on the body in proximity to one another. The plurality of amplifiers are coupled to or part of the plurality of antennas. The computer memory stores a predetermined cases map that lists, for each of a plurality of combinations of frequencies for a plurality of antennas of the vehicle, the predetermined cases map specifying, for each combination of frequencies, an amount of uplink RF power reduction required to reduce the degradation below a predetermined threshold. The computer processor is configured to: retrieve, from the computer memory, the predetermined cases map; determine a current frequency combination for a current plurality of frequencies of the plurality of antennas of the vehicle; and provide instructions to one or more of the amplifiers to adjust a maximum RF power of one or more of the antennas, to thereby reduce receiver performance degradation between the antennas.

Also in an exemplary embodiment, the predetermined cases map is generated during a development stage in which the amount of uplink RF power reduction required to reduce the degradation is examined for a number of different frequency combinations, and wherein the amount of uplink RF power reduction required to reduce the degradation is determined via analysis, using a scientific model, for each of the different frequency combinations.

Also in an exemplary embodiment, the predetermined cases map is generated during a development stage in which the amount of uplink RF power reduction required to reduce the degradation is examined for a number of different frequency combinations, and wherein the amount of uplink RF power reduction required to reduce the degradation is determined via physical testing for each of the different frequency combinations.

Also in an exemplary embodiment, the adjustment of the maximum uplink RF power of the one or more antennas includes a reduction of less than fifty percent of a total uplink RF power for the one or more antennas.

Also in an exemplary embodiment, the adjustment of the maximum uplink RF power of the one or more antennas includes a reduction of less than twenty five percent of a total uplink RF power for the one or more antennas.

Also in an exemplary embodiment, the adjustment of the maximum uplink RF power of the one or more antennas includes a reduction of less than five percent of a total uplink RF power for the one or more antennas.

Also in an exemplary embodiment: the vehicle includes an autonomous vehicle having a roof; and the plurality of antennas are each disposed on the roof of the autonomous vehicle.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
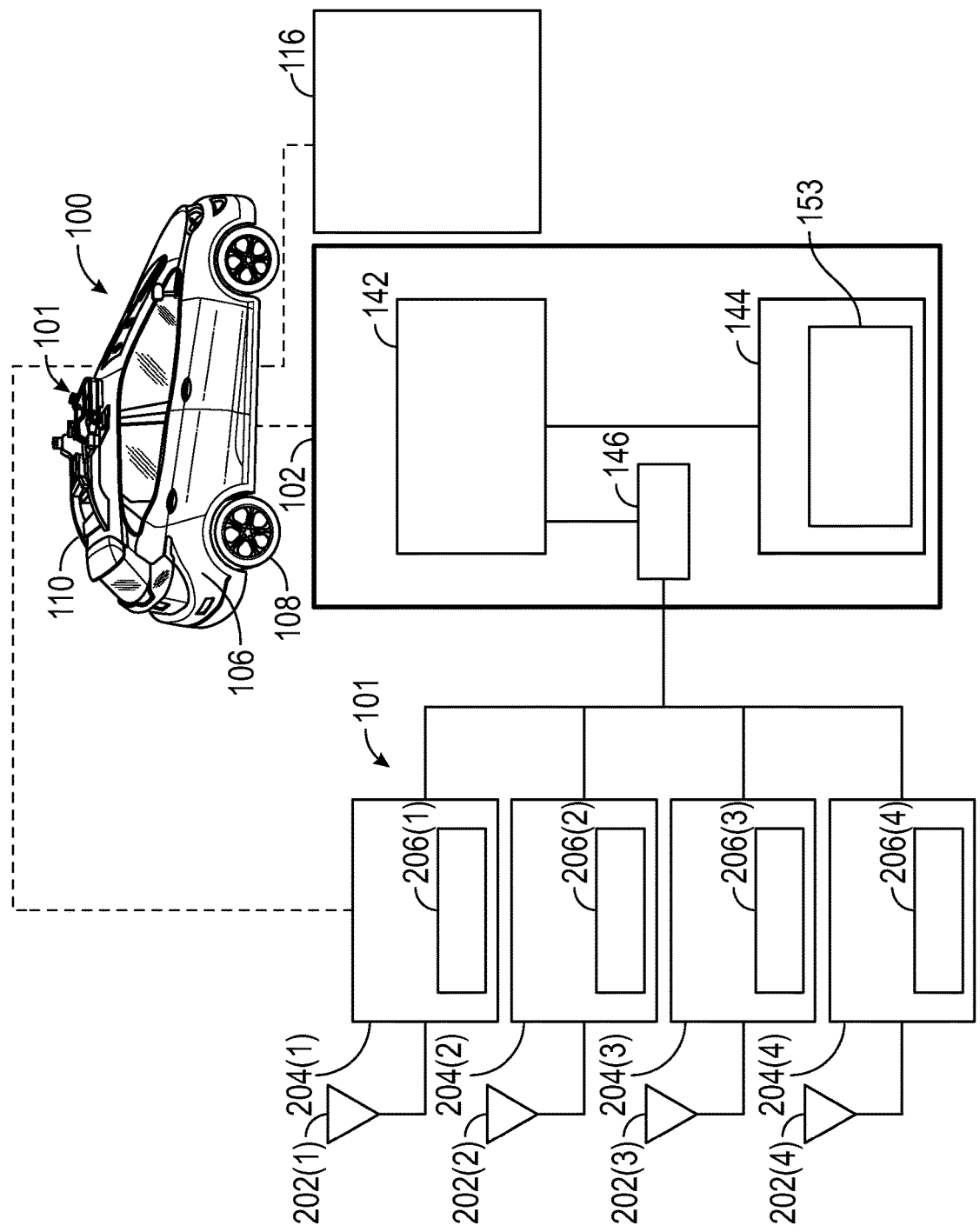
FIG. 1 is a simplified diagram of a vehicle that includes an antenna transceiver system and a control system for controlling the antenna transceiver system with controlled intermodulation, in accordance with an exemplary embodiment.

FIG. 1 illustrates a system 100, according to an exemplary embodiment. In various embodiments, and as described below, the system 100 comprises a vehicle 100. However, this may vary in other embodiments. For example, in certain embodiments, the system 100 may comprise any number of other types of vehicles and/or any number of other types of mobile and/or non-mobile platforms.

As described in greater detail further below, the vehicle 100 includes an antenna transceiver system 101 and a control system 102 for controlling the antennas transceiver system 101, including intermodulation thereof. In various embodiments, the antenna transceiver system 101 comprises a cellular transceiver system that includes antennas for multiple different cellular carriers, for example each of which may utilize different uplink signals at different frequencies for the different antennas. Also as described in greater detail further below, the control system 102 controls operation of the antenna transceiver system 101 in a manner that controls intermodulation thereof.

In certain embodiments, the vehicle 100 comprises an automobile. In various embodiments, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 comprises an autonomous vehicle. However, this may vary in other embodiments. In certain embodiments, the vehicle 100 may also comprise one or more other types of vehicles. In addition, in various embodiments, it will also be appreciated that the vehicle 100 may comprise any number of other types of mobile platforms and/or non-mobile platforms.

In the depicted embodiment, a body 106 of the vehicle 100 substantially encloses other components of the vehicle 100. Also in the depicted embodiment, the vehicle 100 includes a plurality of wheels 108 and a roof 110. Also in the depicted embodiment, the wheels 108 are each disposed near a respective corner of the body 106 to facilitate movement of the vehicle 100. In one embodiment, the vehicle 100 includes four wheels 108, although this may vary in other embodiments (for example for trucks and certain other vehicles). In certain embodiments, the vehicle 100 comprises an autonomous vehicle, such as a semi-autonomous and/or fully autonomous (e.g., self-driving) vehicle 100.

In various embodiments, the vehicle 100 includes a drive system 116 that drives the wheels 108. The drive system 116 preferably comprises a propulsion system. In certain exemplary embodiments, the drive system 116 comprises an internal combustion engine and/or an electric motor/generator. In certain embodiments, the drive system 116 may vary, and/or two or more drive systems 112 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, in various embodiments, the antenna transceiver system 101 includes a plurality of antennas 202. In the depicted embodiment, four antennas 202 are depicted; namely: a first antenna 202(1), a second antenna 202(2), a third antenna 202(3), and a fourth antenna 202(4). However, in various embodiments, the number of antennas 202 may vary.

Figure 2:
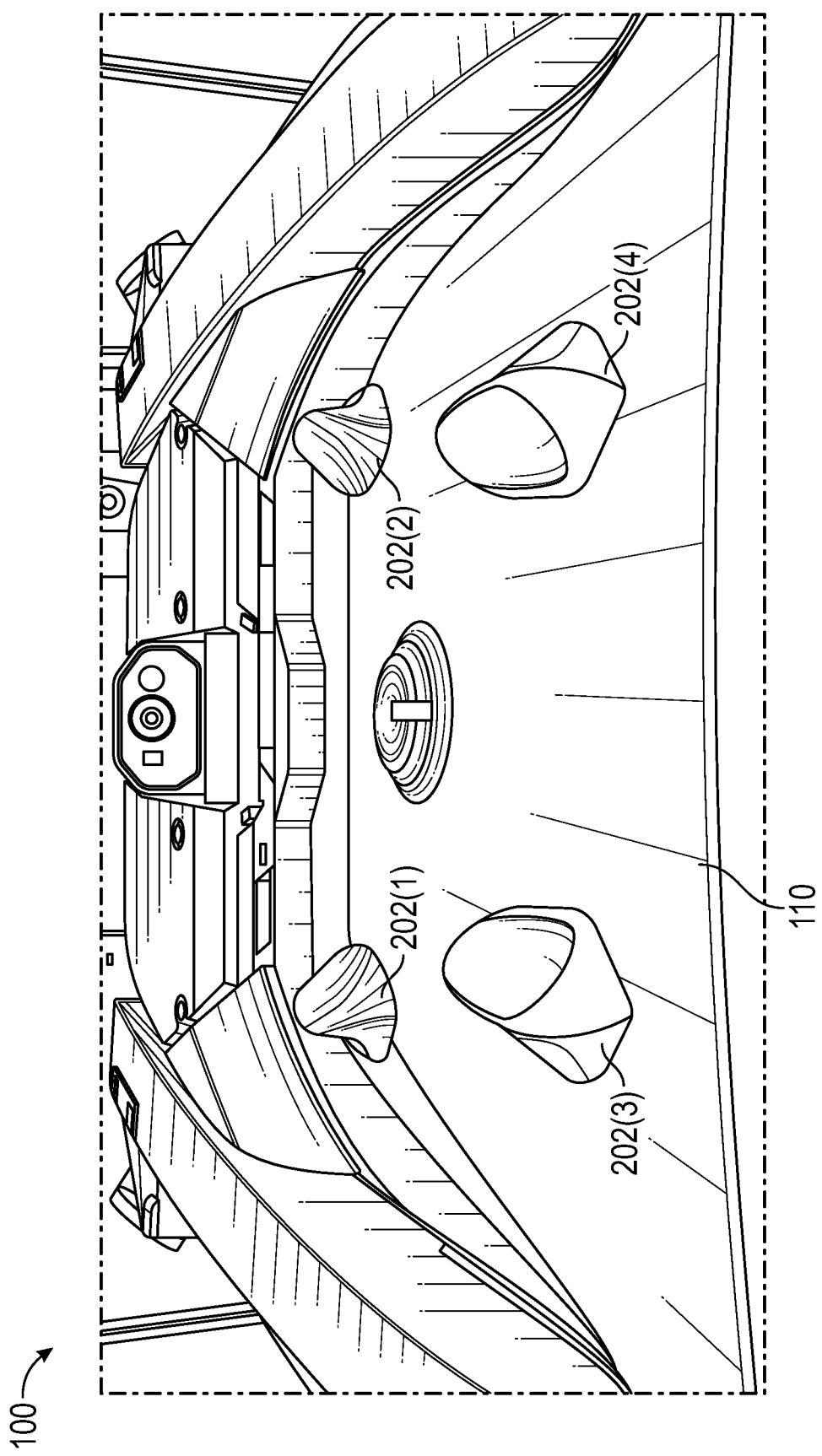
FIG. 2 is a top view of a roof of the vehicle of FIG. 1, depicting a portion of the antenna transceiver system thereof, including four antennas mounted on the roof of the vehicle, in accordance with an exemplary embodiment.

With reference to FIG. 2, in various embodiments, the antenna transceiver system 101 includes a plurality of antennas 202 mounted on the body 106 of the vehicle 100. In the depicted embodiment, the antennas 202 are mounted on the roof 110. Also in the depicted embodiment, the antenna transceiver system 101 includes four antennas 202. However, as noted above, this may also vary in different embodiments. In various embodiments, the antennas of the antenna transceiver system 101 are spaced in proximity to one another on the body 106 of the vehicle 100, such that signal degradation (such as uplink signal interference and/or other signal degradation) may result, particularly without a control strategy to reduce such degradation.

With reference back to FIG. 1, in various embodiments, each of the antennas 202 of the antenna transceiver system 101 includes or is coupled to a transceiver (namely, an RF transceiver) 204 and an amplifier 206. Specifically, in the depicted embodiment of FIG. 1 with four antennas 202: (i) the first antenna 202(1) includes a first transceiver 204(1) and connects to a first amplifier 206(1); (ii) the second antenna 202(2) includes a second transceiver 204(2) and connects to a second amplifier 206(2); (iii) the third antenna 202(3) includes a third transceiver 204(3) and connects to a third amplifier 206(3); and (iv) the fourth antenna 202(4) includes a fourth transceiver 204(4) and connects to a fourth amplifier 206(4). In various embodiments, the first, second, third, and fourth amplifiers 206(1), 206(2), 206(3), and 206(4) amplify signals for the first, second, third, and fourth antennas 202(1), 202(2), 202(3), and 202(4), respectively. In various embodiments, the number of antennas 202, transceivers 204, and amplifiers 206 may vary. However, regardless of the number of antennas 202, in various embodiments, each antenna 202 has its own unique transceiver 204, and amplifier 206.

In addition, also as depicted in FIG. 1, in various embodiments, each of the amplifiers 206(1), 206(2), 206(3), and 206(4) are controlled by the control system 102 based on a map 153 of predetermined cases pertaining to the respective antennas 202(1), 202(2), 202(3), and 202(4).

With continued reference to FIG. 1, in various embodiments, the control system 102 controls the operation of the antennas transceiver system 101, including the antennas 202 thereof. In various embodiments, the control system 102 controls degradation, including degradation, including interference (e.g., intermodulation) between the antennas 202 of the antenna transceiver system 101 by selectively controlling the maximum uplink power of the antennas 202, as set forth in greater detail below in connection with the process 300 depicted in FIG. 3. In various embodiments, the control system 102 controls the maximum uplink RF power for each of the antennas 202 via the respective amplifiers 206 thereof using data from the map 153, in order to minimize degradation, including interference between the antennas 202. In various embodiments, this control is provided in accordance with the control system 102 of FIG. 1 and the steps of the process 300 depicted in FIG. 3 and described below in connection therewith.

In various embodiments, the control system 102 comprises a computer system. In certain embodiments, the control system 102 may also include one or more of the antennas 202, transceivers 104, amplifiers 206, and/or one or more other components of the antenna transceiver system 101, and/or one or more other vehicle 100 components. In addition, it will be appreciated that the control system 102 may otherwise differ from the embodiment depicted in FIG. 1. For example, the control system 102 may be coupled to or may otherwise utilize one or more remote computer systems and/or other control systems, for example as part of one or more of the above-identified vehicle devices and systems.

In the depicted embodiment, the computer system of the control system 102 includes a processor 142, a memory 144, and an interface 146. The processor 142 performs the computation and control functions of the control system 102, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs contained within the memory 144 and, as such, controls the general operation of the control system 102, generally in executing the processes described herein, such as the process 300 discussed further below in connection with FIG. 3.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced programs along with one or more predetermined cases maps 153, and in certain embodiments other stored values for controlling maximum uplink RF power for the antennas 202 of the antenna transceiver system 101, in accordance with the process 300 described further below in connection with FIG. 3.

Also in various embodiments, the map 153 includes a listing or mapping of various predetermined cases corresponding to different simultaneous amplifier uplink RF power combinations for each of the respective antennas 202. In various embodiments, the map 153 is stored in the computer memory 144 and retrieved therefrom by the processor 142.

The interface 146 allows communications to the computer system of the controller 140, for example from a system driver and/or another computer system, and can be implemented using any suitable method and apparatus. In one embodiment, the interface 146 communicates with the antenna transceiver system 101, as well as the drive system 116 and/or one or more other components and/or systems of the vehicle 100. The interface 146 can include one or more network interfaces to communicate with other systems or components. The interface 146 may also include one or more network interfaces to communicate with technicians, and/or one or more storage interfaces to connect to storage apparatuses.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the control system 102 may also otherwise differ from the embodiment depicted in FIG. 1, for example in that the computer system of the control system 102 may be coupled to or may otherwise utilize one or more remote computer systems and/or other control systems.

Figure 3:
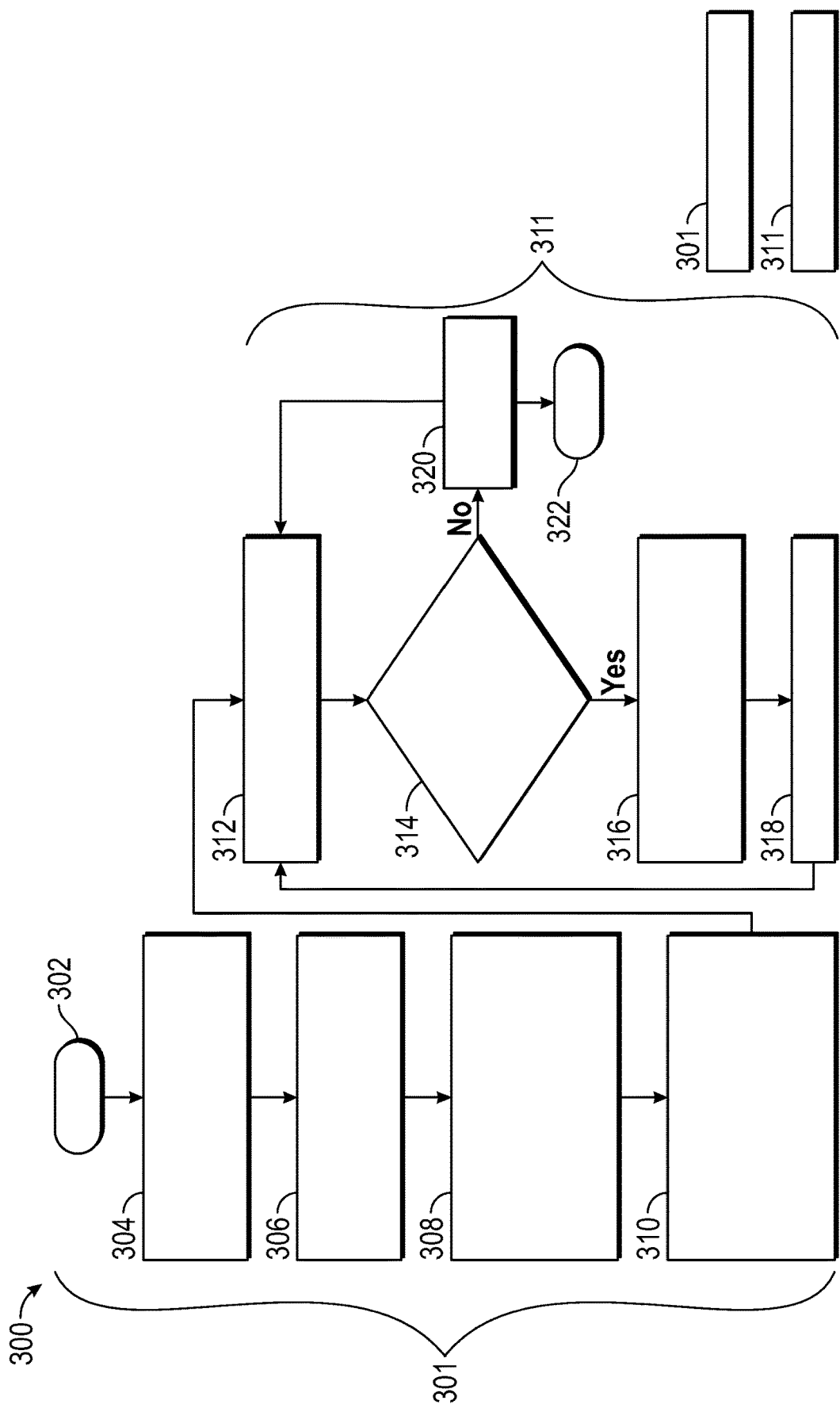
FIG. 3 is a flowchart of a process for controlling the transceiver system of FIGS. 1 and 2, including control of intermodulation thereof, in accordance with an exemplary embodiment.

FIG. 3 is a flowchart of a process 300 for controlling a transceiver system of a vehicle, in accordance with an exemplary embodiment. In an exemplary embodiment, the process 300 is implemented in connection with the vehicle 100, the antenna transceiver system 101, the vehicle 100, and the components thereof, of FIGS. 1 and 2.

In various embodiments, the process 300 starts at 302. Specifically, in various embodiments, the process 300 begins with a first sub-process 301. In various embodiments, the first sub-process 301 occurs during a development stage, for example in which the model of the vehicle 100 is being developed.

In various embodiments, during this development stage of the sub-process 301, a list is generated of multiple uplink transmission frequency channel combinations for the antennas of the vehicle (step 304). Specifically, in various embodiments, during step 304, a full range of possible frequencies is ascertained for each of the antennas, and a list is generated for a complete set of combinations of the various possible frequencies for each of the antennas. In various embodiments, this is performed by a processor, such as the processor 142 of FIG. 1. In various embodiments, the range of frequencies for each antenna pertains all uplink frequencies in which the specific antennas are configured to operate, and/or all uplink frequencies for transmissions received by the specific antennas.

In addition, in various embodiments, also during this development stage of the sub-process 301, the frequency channel combinations of step 304 are reviewed (step 306). In various embodiments, during step 306, the frequency channel combinations of step 304, from the various antennas, are reviewed in order to determine which frequency channel combinations result in degradation, including interference between the antennas. In various embodiments, this is performed by a processor, such as the processor 142 of FIG. 1.

Also in various embodiments, during this development stage of the sub-process 301, analysis (using one or more scientific models) and/or physical testing is performed as to modifications to the frequency channel combinations that may result in degradation, including interference among the antennas (step 308). Specifically, in various embodiments, during step 308, analysis (using one or more scientific models) and/or physical testing (e.g., in a laboratory) is performed in order to ascertain an amount of uplink RF power reduction (or back-off) will result in downlink sensitivity to an acceptable level, and that would reduce receiver performance degradation, including interference between the antennas to an acceptable downlink performance. For example, in certain embodiments, one or more scientific models and/or testing is performed with respect to different amounts of maximum uplink RF power reduction for the amplifiers of the antennas, so as to determine how much maximum uplink RF power reduction is required or each particular frequency channel combination of the different antennas so as to reduce antenna degradation, including interference to an acceptable level (and, for example, that would reduce such degradation, including interference below a predetermined threshold stored in the memory 144 of FIG. 1). In various embodiments, this is performed by a processor, for example the processor 142 of FIG. 1.

In addition, also in various embodiments during this development stage of the sub-process 301, a predetermined cases map is created (step 310). Specifically, in various embodiments, a predetermined cases map is created for each combination of frequency channel combinations of multiple antenna uplink transmissions, so as to include a required amount of maximum uplink RF power reduction (or back-off) for each antenna that is required to reduce receiver performance degradation between the antennas to an acceptable level. In various embodiments, this is performed by a processor, for example the processor 142 of FIG. 1, and the resulting map is stored in computer memory of the vehicle 100, such as the memory 144 of FIG. 1. In various embodiments, the map of step 310 comprises and/or corresponds to the map 153 of FIG. 1.

Next, in various embodiments, a second sub-process 311 of the process 300 is performed. In various embodiments, the second sub-process 311 corresponds to an operation stage, for example after the vehicle is designed, developed, finalized, and sold, and when the vehicle is operated (e.g., either autonomously and/or via a user).

In various embodiments, the second sub-process 311 of the operation stage begins with the step of monitoring multiple uplink frequency combinations for the antennas of the vehicle (step 312). In various embodiments, during step 312, the uplink frequency combinations of the various antennas of the vehicle 100 (including those within close proximity to one another, for example as depicted in FIG. 2) are monitored during operation of the vehicle of FIG. 1. In various embodiments, this is performed by a processor, for example the processor 142 of FIG. 1.

In various embodiments, also during the second sub-process 311 of the operation stage, a determination is made as to whether a reduction of maximum power is required (step 314). In various embodiments, this determination is made based on an examination of the predetermined cases map of step 310 as to whether a reduction in maximum uplink RF power for the amplifier of one or more of the antennas is required to reduce receiver performance degradation, including interference between the antennas to an acceptable level (e.g., in an exemplary embodiment, to reduce the degradation, including interference to less than a predetermined value represented by one or more values that are stored in the memory 144 of the computer system 140 of FIG. 1).

If it is determined in step 314 that a reduction of maximum power is required, then the current amplifier uplink RF power control is adjusted (steps 316 and 318). In various embodiments, during step 316, a maximum amplified uplink RF power is adjusted for one or more of the antennas for the antennas via the amplifiers, via control adjustment instructions provided by one or more controllers and/or processors. For example, in certain embodiments, a processor (for example, the processor 142 of FIG. 1) controls the amplifiers 206(1), 206(2), 206(3), and 206(4) of FIG. 1 to reduce a maximum uplink RF power that is provided by the amplifiers to respective antennas 200(1), 200(2), 200(3), and 200(4) of FIG. 1.

In various embodiments, the adjustment of the maximum uplink RF power is based upon the predetermined cases map. Specifically, in various embodiments, the adjustment of the maximum uplink RF power is equal in magnitude to the adjustment required in order to reduce antenna degradation, including interference to an acceptable level (e.g., such that one or more measures of antenna signal degradation, including interference are less than a predetermined threshold amount). In various embodiments, the required embodiment is stored in the predetermined cases map, and is previously determined during the development stage 301 via analysis (e.g., using one or more scientific models), experimentation, and/or physical testing (e.g., in steps 308 and 310, described above).

Also in various embodiments, the required adjustment to the maximum uplink RF power in step 316, 318 is relatively small as compared with the maximum uplink RF power. For example, in various embodiments, the required adjustment to the maximum uplink RF power is less than fifty percent (50%) of the uplink RF power for without adjustment. For example, in one embodiment in which the total uplink RF power is equal to fifteen decibels milliwatt (15 dBm), the adjustment to the maximum uplink RF power may be equal to six decibels (3 dB), for example such that uplink RF power is still provided to the antenna in amounts up to nine decibels milliwatt (12 dBm).

By way of additional example, in various embodiments, the required adjustment to the maximum uplink RF power is less than twenty percent (20%) of the total uplink RF power for the antenna. For example, in one embodiment in which the total uplink RF power for an antenna is equal to twenty decibels milliwatt (20 dBm), the adjustment to the maximum uplink RF power may be equal to one decibel (1 dB), for example such that uplink RF power is still provided to the antenna in amounts up to nineteen decibels milliwatt (19 dBm).

In certain embodiments, maximum uplink RF power is reduced for each of the antennas that may be in close proximity to one another on the vehicle (e.g., as set forth in the predetermined cases map). In certain embodiments, maximum uplink RF power is reduced for only one antenna, or for a subset of the antennas that are in close proximity to one another on the vehicle (e.g., as set forth in the predetermined cases map).

In various embodiments, the maximum uplink RF power reduction is performed during two steps. Specifically, in various embodiments, the instructions for the maximum uplink RF power reduction are provided in step 316 by a processor (for example, the processor 142 of FIG. 1). Also in various embodiments, the instructions are then implemented in step 318 (for example, by the adjustments applied to the amplifiers 206(1), 206(2), 206(3), and 206(4) of FIG. 1 in implementing the instructions). In various embodiments, the process 300 then terminates at step 322 (and, in certain embodiments, subsequently re-starts at step 312 in a new operation stage 311 the next time the vehicle 100 is operated, and so on).

Conversely, if it is determined instead in step 314 that a reduction of maximum RF power is not required, then a current amplifier uplink RF power control is maintained (step 320). In various embodiments, during step 320, a standard or "normal" uplink RF power control is provided for the antennas via the amplifiers, without any adjustments and/or limiting of uplink RF power thereto, as controlled by one or more controllers and/or processors. For example, in certain embodiments, a processor (for example, the processor 142 of FIG. 1) controls the amplifiers (e.g., the amplifiers 206(1), 206(2), 206(3), and 206(4) of FIG. 1) to allow uplink RF power for the antennas (e.g., the antennas 200(1), 200(2), 200(3), and 200(4) of FIG. 1) without limitation (e.g., without limitation of the maximum uplink RF power thereto). In various embodiments, the process 300 then terminates at step 322 (and, in certain embodiments, subsequently re-starts at step 312 in a new operation stage 311 the next time the vehicle 100 is operated, and so on).

Accordingly, systems, methods, and vehicle are provided for controlling an antenna transceiver systems for vehicles. In various embodiment, for example in which multiple antennas are disposed in close proximity to one another, a maximum amplifier uplink RF power is reduced for one or more of the antennas when required to reduce antenna degradation to an acceptable level. In various embodiments, this is accomplished via one or more processors in controlling amplifiers coupled to the antennas, based on a predetermined cases map that is stored in computer memory, and that was previously determined during a development stage via analysis (e.g., using one or more scientific models) experimentation, and/or physical testing.

It will be appreciated that the systems, vehicles, methods, applications, and implementations may vary from those depicted in the Figures and described herein. For example, in various embodiments, the vehicle 100, the antenna transceiver system 101, the control system 102, and/or various components thereof, and/or other components may differ from those depicted in FIGS. 1 and 2. It will similarly be appreciated that the steps of the process 300 may differ, and/or that various steps thereof may be performed simultaneously and/or in a different order, than those depicted in FIG. 3 and/or described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   determining, via a processor, a current frequency combination for a plurality of frequencies of respective antennas of a vehicle;
   retrieving, from a computer memory, a predetermined cases map that that specifies, for a plurality of antenna frequency combinations, an amount of uplink RF power reduction required to reduce the degradation below a predetermined threshold; and
   adjusting, via instructions provided by the processor to one or more amplifiers of the antennas, a maximum RF power of one or more of the antennas, based on the current frequency combination and the predetermined cases map, to thereby reduce receiver performance degradation between the antennas.

2. The method of claim 1, wherein the predetermined cases map is generated during a development stage in which the amount of uplink RF power reduction required to reduce the degradation is examined for a number of different frequency combinations.

3. The method of claim 2, wherein the amount of uplink RF power reduction required to reduce the degradation is determined via analysis, using a scientific model, for each of the different frequency combinations.

4. The method of claim 2, wherein the amount of uplink RF power reduction required to reduce the degradation is determined via physical testing for each of the different frequency combinations.

5. The method of claim 1, wherein the adjustment of the maximum uplink RF power of the one or more antennas comprises a reduction of less than fifty percent of a total uplink RF power for the one or more antennas.

6. The method of claim 1, wherein the adjustment of the maximum uplink RF power of the one or more antennas comprises a reduction of less than twenty five percent of a total uplink RF power for the one or more antennas.

7. The method of claim 1, wherein the adjustment of the maximum uplink RF power of the one or more antennas comprises a reduction of less than five percent of a total uplink RF power for the one or more antennas.

8. A system comprising:
a non-transitory computer readable storage medium storing a predetermined cases map that lists, for each of a plurality of combinations of frequencies for a plurality of antennas of a vehicle, the predetermined cases map specifying, for each combination of frequencies, an amount of uplink RF power reduction required to reduce the degradation below a predetermined threshold; and
a computer processor coupled to the non-transitory computer readable storage medium configured to:
retrieve, from the non-transitory computer readable storage medium, the predetermined cases map
determine a current frequency combination for a current plurality of frequencies of the plurality of antennas of the vehicle; and
provide instructions to one or more amplifiers of the antennas to adjust a maximum RF power of one or more of the antennas, to thereby reduce receiver performance degradation between the antennas.

9. The system of claim 8, wherein the predetermined cases map is generated during a development stage in which the amount of uplink RF power reduction required to reduce the degradation is examined for a number of different frequency combinations, and wherein the amount of uplink RF power reduction required to reduce the degradation is determined via analysis, using a scientific model, for each of the different frequency combinations.

10. The system of claim 8, wherein the predetermined cases map is generated during a development stage in which the amount of uplink RF power reduction required to reduce the degradation is examined for a number of different frequency combinations, and wherein the amount of uplink RF power reduction required to reduce the degradation is determined via physical testing for each of the different frequency combinations.

11. The system of claim 8, wherein the adjustment of the maximum uplink RF power of the one or more antennas comprises a reduction of less than fifty percent of a total uplink RF power for the one or more antennas.

12. The system of claim 8, wherein the adjustment of the maximum uplink RF power of the one or more antennas comprises a reduction of less than twenty five percent of a total uplink RF power for the one or more antennas.

13. The system of claim 8, wherein the adjustment of the maximum uplink RF power of the one or more antennas comprises a reduction of less than five percent of a total uplink RF power for the one or more antennas.

14. A vehicle comprising:
a body;
a plurality of antennas stored on the body in proximity to one another;
a plurality of amplifiers coupled to or part of the plurality of antennas;
a computer memory storing a predetermined cases map that lists, for each of a plurality of combinations of frequencies for a plurality of antennas of the vehicle, the predetermined cases map specifying, for each combination of frequencies, an amount of uplink RF power reduction required to reduce the degradation below a predetermined threshold; and
a computer processor configured to:
retrieve, from the computer memory, the predetermined cases map;
determine a current frequency combination for a current plurality of frequencies of the plurality of antennas of the vehicle; and
provide instructions to one or more of the amplifiers to adjust a maximum RF power of one or more of the antennas, to thereby reduce receiver performance degradation between the antennas.

15. The vehicle of claim 14, wherein the predetermined cases map is generated during a development stage in which the amount of uplink RF power reduction required to reduce the degradation is examined for a number of different frequency combinations, and wherein the amount of uplink RF power reduction required to reduce the degradation is determined via analysis, using a scientific model, for each of the different frequency combinations.

16. The vehicle of claim 14, wherein the predetermined cases map is generated during a development stage in which the amount of uplink RF power reduction required to reduce the degradation is examined for a number of different frequency combinations, and wherein the amount of uplink RF power reduction required to reduce the degradation is determined via physical testing for each of the different frequency combinations.

17. The vehicle of claim 14, wherein the adjustment of the maximum uplink RF power of the one or more antennas comprises a reduction of less than fifty percent of a total uplink RF power for the one or more antennas.

18. The vehicle of claim 14, wherein the adjustment of the maximum uplink RF power of the one or more antennas comprises a reduction of less than twenty five percent of a total uplink RF power for the one or more antennas.

19. The vehicle of claim 14, wherein the adjustment of the maximum uplink RF power of the one or more antennas comprises a reduction of less than five percent of a total uplink RF power for the one or more antennas.

20. The vehicle of claim 14, wherein:
the vehicle comprises an autonomous vehicle having a roof; and
the plurality of antennas are each disposed on the roof of the autonomous vehicle.

* * * * *